(12) United States Patent
Wu (10) Patent No.: US 10,356,646 B2
(45) Date of Patent: Jul. 16, 2019

(54) DEVICE AND METHOD FOR HANDLING MEASUREMENT GAPS

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/955,717

(22) Filed: Apr. 18, 2018

(65) Prior Publication Data

US 2018/0302942 A1 Oct. 18, 2018

Related U.S. Application Data

(60) Provisional application No. 62/486,938, filed on Apr. 18, 2017.

(51) Int. Cl.
| | |
|---|---|
| *H04W 24/10* | (2009.01) |
| *H04W 36/00* | (2009.01) |
| *H04W 76/18* | (2018.01) |
| *H04W 76/19* | (2018.01) |
| *H04W 76/27* | (2018.01) |
| *H04W 24/04* | (2009.01) |
| *H04L 5/00* | (2006.01) |

(52) U.S. Cl.
CPC .......... *H04W 24/10* (2013.01); *H04L 5/0053* (2013.01); *H04W 24/04* (2013.01); *H04W 36/0088* (2013.01); *H04W 76/18* (2018.02); *H04W 76/19* (2018.02); *H04W 76/27* (2018.02); *H04L 5/001* (2013.01); *H04W 36/0083* (2013.01)

(58) Field of Classification Search
CPC ............. H04W 24/10; H04W 36/0058; H04W 36/0085; H04W 36/0088; H04W 36/0094; H04W 56/0065; H04W 56/007; H04W 56/009; H04W 76/18; H04W 76/19; H04W 24/04; H04L 5/0053
See application file for complete search history.

(56) References Cited

U.S. PATENT DOCUMENTS

| | | | |
|---|---|---|---|
| 2012/0057474 A1 | 3/2012 | Hirano | |
| 2014/0192740 A1 | 7/2014 | Ekpenyong | |
| 2015/0071101 A1* | 3/2015 | Mager | H04W 24/10 370/252 |
| 2015/0323645 A1* | 11/2015 | Siomina | H04W 24/10 455/456.1 |
| 2017/0127397 A1* | 5/2017 | Hahn | H04W 28/0236 |

FOREIGN PATENT DOCUMENTS

| | | |
|---|---|---|
| CN | 105027480 A | 11/2015 |
| WO | 2013/025187 A1 | 2/2013 |

OTHER PUBLICATIONS

Search Report dated Jun. 1, 2018 for EP application No. 18168016. 6, pp. 1-6.

(Continued)

*Primary Examiner* — Ashley Shivers
(74) *Attorney, Agent, or Firm* — Winston Hsu (57) ABSTRACT

The present invention relates to a method and an apparatus for handling measurement gaps and performing measurement upon detection of a failure in a mobile communication system.

14 Claims, 5 Drawing Sheets

(56) References Cited

OTHER PUBLICATIONS

3GPP TS 36.300 V14.2.0 (Mar. 2017), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", XP051291440, pp. 1-330.
3GPP TS 36.331 V14.2.0 (Mar. 2017), "3rd Generation Partnership Project; Technical Specification Group Radio Access Network; Evolved Universal Terrestrial Radio Access (E-UTRA); Radio Resource Control (RRC); Protocol specification (Release 14)", XP051291443, pp. 1-721.
Notice of Allowance dated Dec. 27, 2018 for the Taiwan application No. 107113228, filing date Apr. 18, 2018, pp. 1-4.
ETSI TS 136 300 v14.2.0, LTE; Evolved Universal Terrestrial Radio Access (E-UTRA) and Evolved Universal Terrestrial Radio Access Network (E-UTRAN); Overall description; Stage 2(3GPP TS 36.300 version 14.2.0 Release 14), Apr. 2017.
3GPP TS 36.331 V14.2.0 (Mar. 2017), Technical Specification 3rd Generation Partnership Project; Technical Specification Group Radio Access Network; Evolved Universal Terrestrial Radio Access (E-UTRA); Radio Resource Control (RRC); Protocol specification (Release 14).
3GPP TSG-RAN2 Meeting #97, R2-1702407, Athens, Greece, Feb. 13-17, 2017.
3GPP TSG-RAN Meeting #72, RP-160914, Busan, South Korea, Jun. 13-16, 2016.
3GPP TR 38.804 V1.0.0 (Mar. 2017) Technical Report 3rd Generation Partnership Project; Technical Specification Group Radio Access Network; Study on New Radio Access Technology; Radio Interface Protocol Aspects (Release 14).

\* cited by examiner

DEVICE AND METHOD FOR HANDLING MEASUREMENT GAPS

CROSS REFERENCE TO RELATED APPLICATIONS

This application claims the benefit of U.S. Provisional Applications No. 62/486,938 filed on Apr. 18, 2017, which is incorporated herein by reference.

BACKGROUND OF THE INVENTION

1. Field of the Invention

The present invention relates to a device and a method used in a wireless communication system, and more particularly, to a device and a method of handling measurement gaps in a wireless communication system.

2. Description of the Prior Art

When a communication device performs a carrier aggregation (CA), the same measurement gap in a timeline is applied to the carriers. However, how to handle a configuration of the measurement gaps when a failure is detected is still unknown.

SUMMARY OF THE INVENTION

The present invention therefore provides a communication device for handling measurement gaps to solve the abovementioned problem.

A communication device for handling measurement gaps comprises a storage device for storing instructions and a processing circuit coupled to the storage device. The processing circuit is configured to execute the instructions stored in the storage device. The instructions comprise receiving a measurement gap configuration from a base station (BS) on a first carrier, wherein the measurement gap configuration configures a plurality of measurement gaps for the communication device; determining a plurality of gap locations of the plurality of measurement gaps in a timeline according to system time acquired from the BS and the measurement gap configuration; performing at least one measurement on a second carrier in at least one of the plurality of measurement gaps according to the plurality of gap locations; detecting a failure; and releasing or keeping the measurement gap configuration in response to the failure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
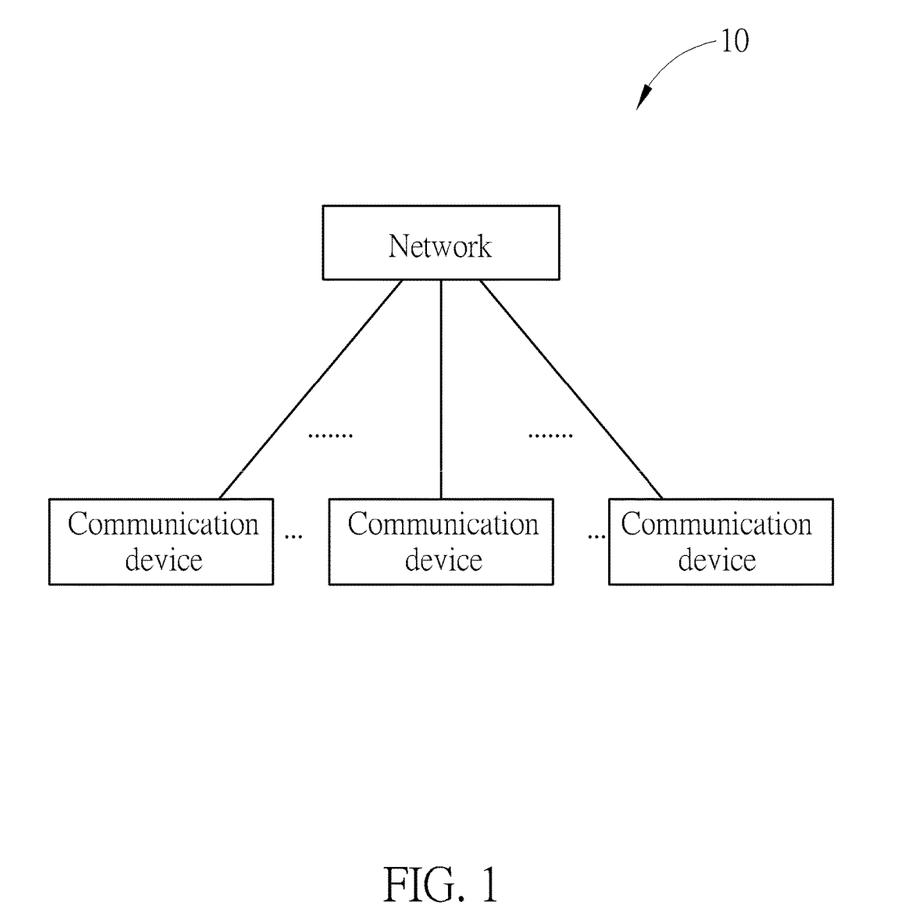
FIG. 1 is a schematic diagram of a wireless communication system according to an example of the present invention.

In FIG. 1, the wireless communication system 10 is composed of a network and a plurality of communication devices. The network and a communication device may communicate with each other via one or more carriers, or via one or multiple cells belonging to one or multiple base stations (BSs).

In FIG. 1, the network and the communication devices are simply utilized for illustrating the structure of the wireless communication system 10. Practically, the network comprises at least one of a long-term evolution (LTE) network and a new radio (NR) network. The LTE network comprises at least one of an evolved universal terrestrial radio access network (E-UTRAN) including at least one evolved Node-B (eNB) and an Evolved Packet Core (EPC). The NR network comprises a fifth generation (5G) radio access network including at least one 5G BS (called gNB or an evolved eNB (eLTE eNB)) and a Next Generation Core (NGC).

A communication device maybe a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction of transmission (i.e., transmission direction), e.g., for an uplink (UL), the communication device is the transmitter and the network is the receiver, and for a downlink (DL), the network is the transmitter and the communication device is the receiver.

Figure 2:
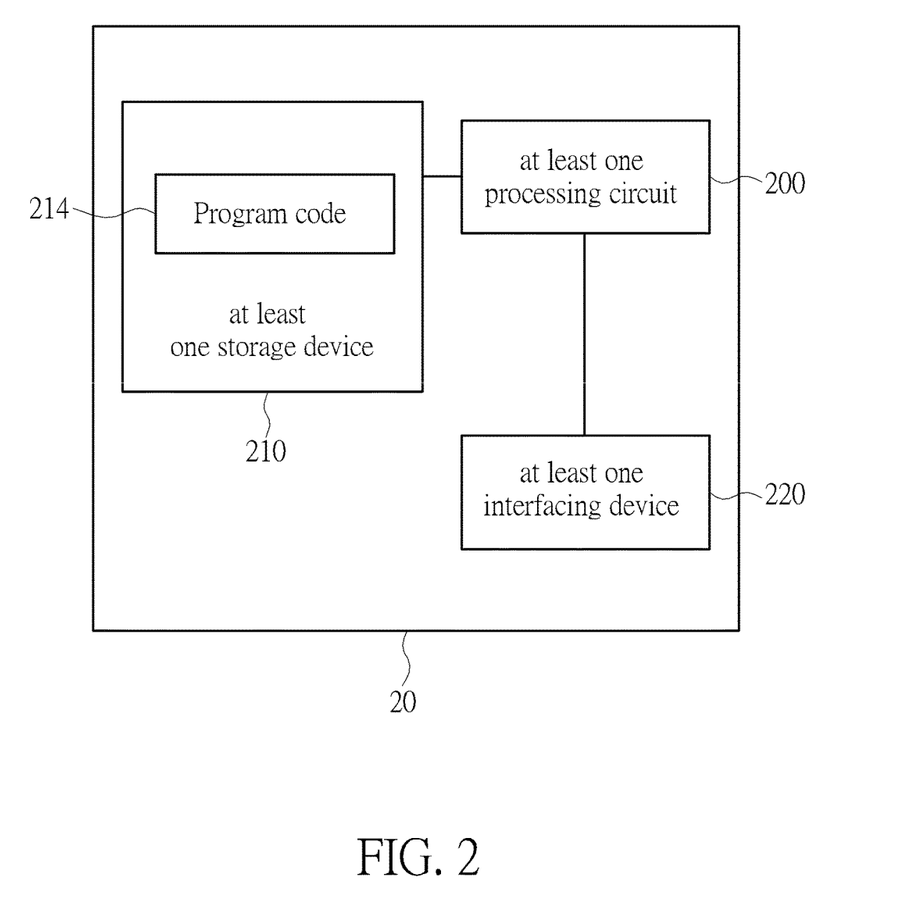
FIG. 2 is a schematic diagram of a communication device according to an example of the present invention.

In FIG. 2, the communication device 20 may be a communication device or the network shown in FIG. 1, but is not limited herein. The communication device 20 may include at least one processing circuit 200 of which each may be a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 comprises at least one transceiver used to transmit and receive signals (e.g., data, messages and/or packets) according to processing results of the at least one processing circuit 200.

In the following embodiments, a UE is used for representing a communication device in FIG. 1, to simplify the illustration of the embodiments.

Figure 3:
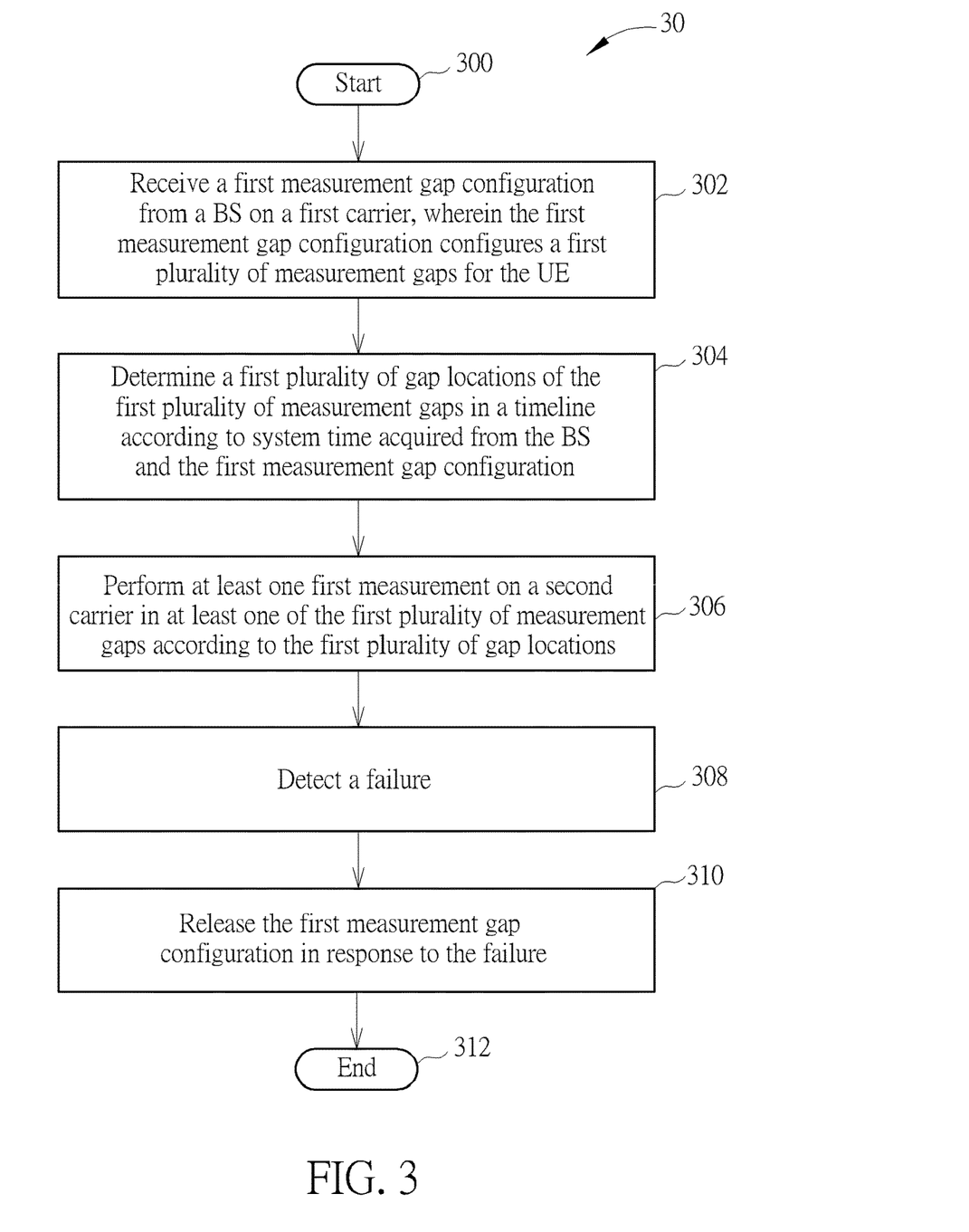
FIG. 3 is a flowchart of a process according to an example of the present invention.

A process 30 as shown in FIG. 3 can be utilized in a UE, and includes the following steps:

Step 300: Start.

Step 302: Receive a first measurement gap configuration from a BS on a first carrier, wherein the first measurement gap configuration configures a first plurality of measurement gaps for the UE.

Step 304: Determine a first plurality of gap locations of the first plurality of measurement gaps in a timeline according to system time acquired from the BS and the first measurement gap configuration.

Step 306: Perform at least one first measurement on a second carrier in at least one of the first plurality of measurement gaps according to the first plurality of gap locations.

Step 308: Detect a failure.

Step 310: Release the first measurement gap configuration in response to the failure.

Step 312: End.

The following examples may be applied to the process 30.

In one example, the UE may transmit at least one first measurement result of the second carrier (i.e., the measurement result(s) of neighboring cells on the second carrier) to the BS when performing (or in response to) the at least one first measurement.

In one example, the failure comprises a radio link failure, a handover failure, an integrity check failure, or a radio resource control (RRC) connection reconfiguration failure. The UE may perform a RRC connection reestablishment procedure in response to the failure.

In one example, the UE may transmit a RRC message (e.g., RRCConnectionReestablishmentRequest message) to the BS to perform the RRC connection reestablishment procedure. The BS may release the first measurement gap configuration in response to the RRC message (i.e., in response to the RRC connection reestablishment procedure). The BS transmits a RRC response message (e.g., a RRC-ConnectionReestablishment message) to the UE in response to the RRC message.

In one example, the UE receives a second measurement gap configuration from the BS, before or after performing the RRC connection reestablishment procedure successfully, wherein the second measurement gap configuration configures a second plurality of measurement gaps for the UE. The UE determines a second plurality of gap locations of the second plurality of measurement gaps in the timeline according to the system time acquired from the BS and the second measurement gap configuration. The UE performs at least one second measurement on the second carrier in at least one of the second plurality of measurement gaps according to the second plurality of gap locations. The UE transmits at least one second measurement result of the second carrier in response to the at least one second measurement, to the BS.

In one example, the first measurement gap configuration is a carrier-specific (or serving cell specific) measurement gap configuration (or called per component carrier (CC) measurement gap configuration), and the second measurement gap configuration is a UE-specific measurement gap configuration (or called per UE measurement gap configuration). For example, the first measurement gap configuration is only applied to a third carrier, and the second measurement gap configuration is applied to all carriers on which the UE is performing reception(s). The first measurement gap configuration includes a first serving cell identity of a first serving cell using the third carrier for performing transmission(s), and the second measurement gap configuration does not include any serving cell identity. The BS does not schedule (or perform) a transmission to the UE on the first serving cell in the first plurality of measurement gaps and may schedule a transmission to the UE on a serving cell other than the first serving cell. The BS does not schedule a transmission to the UE on any serving cell (including the third serving cell) in the second plurality of measurement gaps.

In one example, the second measurement gap configuration is applied to a fourth carrier configured to the UE (e.g., for carrier aggregation (CA) or dual connectivity (DC)). The second measurement gap configuration includes a second serving cell identity of a second serving cell using the fourth carrier. The UE applies the second measurement gap configuration to the fourth carrier (or to the second serving cell). The BS does not schedule (or perform) a transmission to the UE on the second serving cell in the second plurality of measurement gaps.

In one example, when the UE or the BS releases the first measurement gap configuration in response to the failure or the RRC connection reestablishment procedure, the UE or the BS keeps the second measurement gap configuration, if the UE receives the second measurement gap configuration from the BS before detecting the failure. That is, the second measurement gap configuration is not released in response to the failure or the RRC connection reestablishment procedure. The UE or the BS may apply the second measurement gap configuration after recovering the failure or performing the RRC connection reestablishment procedure successfully.

In one example, the BS transmits the second measurement gap configuration to the UE in response to releasing the first measurement gap configuration, if the BS transmits the second measurement gap configuration to the UE after the failure. In another example, the BS transmits the first measurement gap again to the UE in a RRC Reconfiguration message (e.g., RRCConnectionReconfiguration message) when configuring the first serving cell or the third carrier after the RRC connection reestablishment procedure.

In one example, the UE stops performing the at least one first measurement on the second carrier, when (or in response to) releasing the first measurement gap configuration. The UE may receive a plurality of transmissions in gap(s) configured by the first measurement gap configuration instead of performing the at least one first measurement in the gap(s).

In one example, the BS determines the first plurality of gap locations of the first plurality of measurement gaps in the timeline according to system time of the BS and the first measurement gap configuration. The BS may transmits the second measurement gap configuration to the UE in an RRC reconfiguration message (e.g., RRCConnectionReconfiguration message) on the RRC connection, before receiving the RRC message or after transmitting the RRC response message. The BS may determine the second plurality of gap locations of the second plurality of measurement gaps in the timeline according to the system time of the BS and the second measurement gap configuration. The BS does not schedule transmissions to the UE in the second plurality of measurement gaps. The BS may receive a RRC reconfiguration complete message (e.g., a RRC Connection Reconfiguration Complete message) responding to the RRC reconfiguration message, from the UE.

Figure 4:
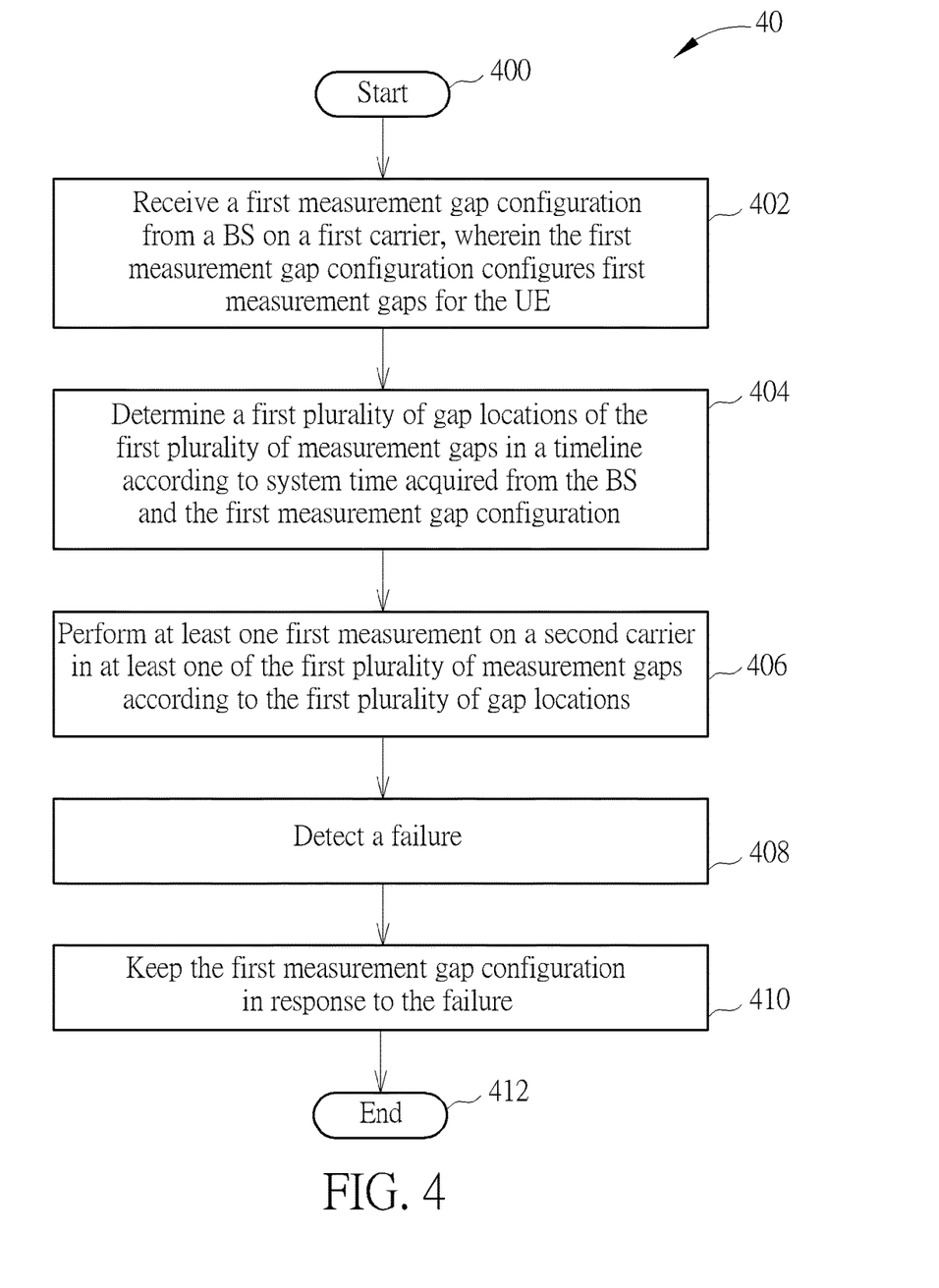
FIG. 4 is a flowchart of a process according to an example of the present invention.

A process 40 as shown in FIG. 4 can be utilized in a UE, and includes the following steps:

Step 400: Start.

Step 402: Receive a first measurement gap configuration from a BS on a first carrier, wherein the first measurement gap configuration configures first measurement gaps for the UE.

Step 404: Determine a first plurality of gap locations of the first plurality of measurement gaps in a timeline according to system time acquired from the BS and the first measurement gap configuration.

Step 406: Perform at least one first measurement on a second carrier in at least one of the first plurality of measurement gaps according to the first plurality of gap locations.

Step 408: Detect a failure.

Step 410: Keep the first measurement gap configuration in response to the failure.

Step 412: End.

Examples for the process 30 may be applied to the process 40. The following examples may be applied to the process 40.

In one example, the first measurement gap configuration may be a carrier-specific measurement gap configuration or a UE-specific measurement gap configuration.

In one example, the UE may perform a RRC connection reestablishment procedure in response to the failure. The UE may transmit a RRC message to the BS to perform the RRC connection reestablishment procedure. The BS keeps the first measurement gap configuration in response to the RRC connection reestablishment procedure (or in response to the RRC message).

In one example, the UE or the BS stops using the first measurement gap configuration in response to the failure or the RRC connection reestablishment procedure. In response to (or when) stopping using the first measurement gap configuration, the UE may receive at least one transmission in subframes or timeslots in gap (s) configured by the first measurement gap configuration. The UE may stop performing any measurement on the second carrier in response to stopping using the first measurement gap configuration. In response to (or when) stopping using the first measurement gap configuration, the BS may perform at least one transmission in the subframes or the timeslots in gap(s) configured by the first measurement gap configuration.

In one example, the UE or the BS may use (or resume using) the first measurement gap configuration after/when/upon/in response to successfully recovering the failure by the RRC connection reestablishment procedure. In another example, the UE or the BS may use the first measurement gap configuration after/when/upon/in response to a RRC reconfiguration procedure (e.g., RRC connection reconfiguration procedure) after successfully recovering the failure by the RRC connection reestablishment procedure. When the UE uses the first measurement gap configuration, the UE performs at least one third measurement on the second carrier. When the BS uses the first measurement gap configuration, the BS may not schedule a transmission to the UE in gap(s) configured by the first measurement gap configuration.

In one example, in the RRC reconfiguration procedure, the UE receives an RRC reconfiguration message (e.g., RRC Connection Reconfiguration message) from the BS and transmits an RRC reconfiguration complete message (e.g., RRC Connection reconfiguration Complete message) to the BS in response to the RRC reconfiguration message.

Figure 5:
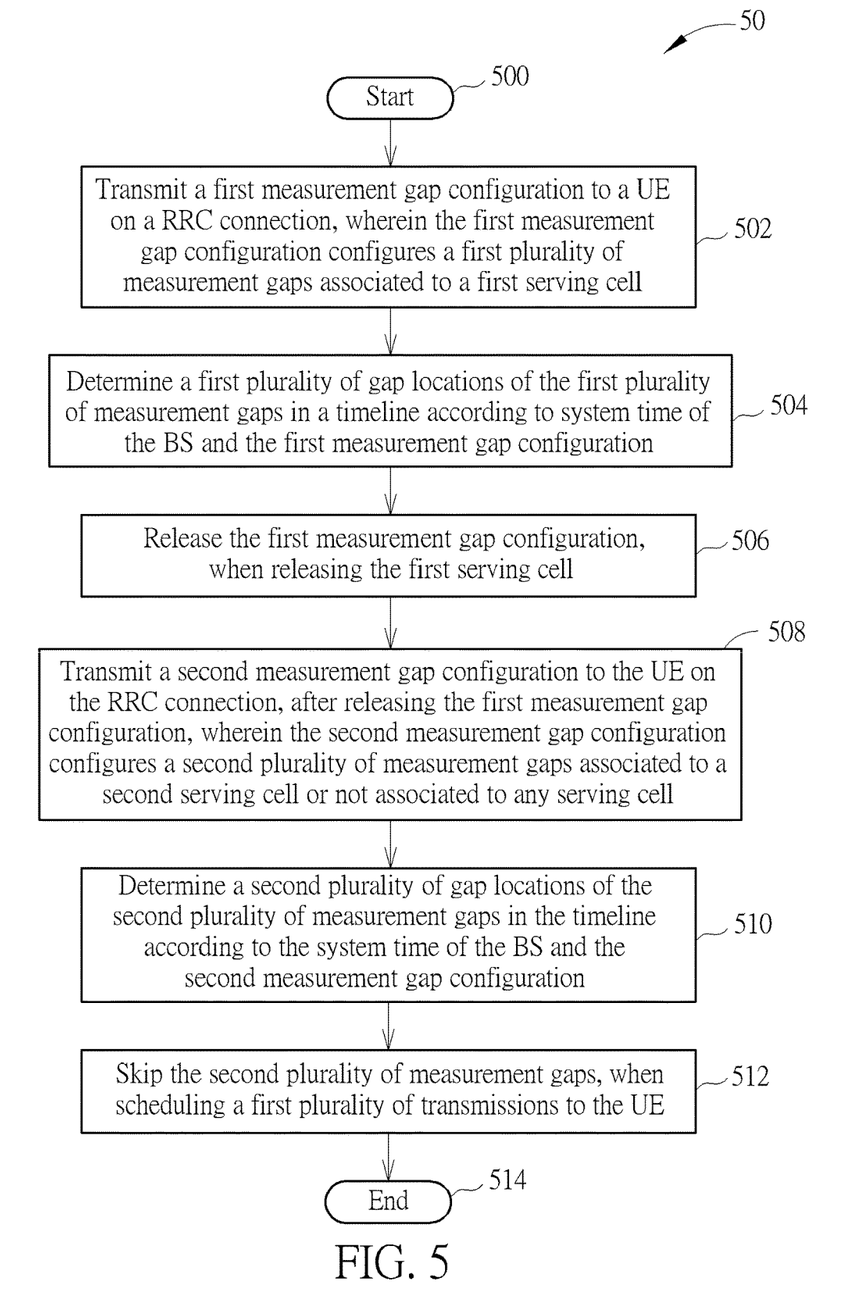
FIG. 5 is a flowchart of a process according to an example of the present invention.

A process 50 as shown in FIG. 5 can be utilized in a BS, and includes the following steps:

Step 500: Start.

Step 502: Transmit a first measurement gap configuration to a UE on a RRC connection, wherein the first measurement gap configuration configures a first plurality of measurement gaps associated to a first serving cell.

Step 504: Determine a first plurality of gap locations of the first plurality of measurement gaps in a timeline according to system time of the BS and the first measurement gap configuration.

Step 506: Release the first measurement gap configuration, when releasing the first serving cell.

Step 508: Transmit a second measurement gap configuration to the UE on the RRC connection, after releasing the first measurement gap configuration, wherein the second measurement gap configuration configures a second plurality of measurement gaps associated to a second serving cell or not associated to any serving cell.

Step 510: Determine a second plurality of gap locations of the second plurality of measurement gaps in the timeline according to the system time of the BS and the second measurement gap configuration.

Step 512: Skip the second plurality of measurement gaps, when scheduling a first plurality of transmissions to the UE.

Step 514: End.

According to the process 50, the BS transmits the second measurement gap configuration to the UE on the RRC connection, after releasing the first measurement gap configuration. Thus, the UE can use the second measurement gap configuration to perform measurement (s) on a carrier after releasing the first measurement gap configuration as described in the process 30.

Examples for the process 30 may be applied to the process 50. The following examples may be applied to the process 50.

In one example, the first serving cell uses a third carrier to perform transmission(s) to the UE. The second serving cell uses a fourth carrier to perform transmission(s) to the UE. A third serving cell uses the first carrier to perform transmission(s) to the UE.

In one example, the BS skips the first plurality of measurement gaps, when scheduling a second plurality of transmissions to the UE. When the BS skips the first plurality of measurement gaps, the BS does not schedule (or perform) a transmission to the UE on the first serving cell in the first plurality of measurement gaps. When the BS skips the second plurality of measurement gaps, the BS does not schedule (or perform) a transmission to the UE on the second serving cell in the second plurality of measurement gaps. When the second plurality of measurement gaps are only associated to the second serving cell, the BS schedules (or performs) a transmission to the UE on the third serving cell in at least one of the second plurality of measurement gaps. When the second plurality of measurement gaps are not associated to any serving cells, the BS does not schedule (or perform) a transmission to the UE on any serving cell (including the third serving cell) in the second plurality of measurement gaps.

In one example, the BS transmits a first RRC message (e.g., a RRC reconfiguration message) to release the first serving cell for the UE. The BS receives a first RRC response message (e.g., a RRC reconfiguration complete message) from the UE in response to the first RRC message.

In one example, the BS transmits the second measurement gap configuration in the first RRC message or in a second RRC message (e.g., a RRC reconfiguration message) on the RRC connection, to the UE. The BS receives a second RRC response message (e.g., a RRC reconfiguration complete message) from the UE in response to the second RRC message.

In one example, the BS keeps the second measurement gap configuration, when releasing the first measurement gap configuration.

In one example, when the BS releases the first measurement gap configuration in response to the RRC connection reestablishment procedure with the UE, or in response to (or when) releasing the first measurement gap configuration or releasing the first serving cell, the BS keeps (e.g., maintains) the second measurement gap configuration, if the BS transmits the second measurement gap configuration to the UE before the RRC connection reestablishment procedure. That is, the second measurement gap configuration is not released. The BS transmits the second measurement gap configuration to the UE in response to releasing the first measurement gap configuration.

Examples for the processes 30-50 can be applied to any of the processes 30-50, and are not narrated herein. The following examples may be applied to the processes 30-50.

In one example, "serving cell" above may be replaced by "carrier".

In one example, the system time (e.g., a system timing) comprises at least one of a system frame number (SFN), a subframe number, a timeslot number and a synchronization signal (SS) block number. In one example, the system time comprises a SS burst set number, a SS burst number, a SS block number or any of their combinations. In one example, the SS burst set number identifies a SS burst set which includes a plurality of SS bursts. In one example, the SS burst set number identifies a plurality of SS blocks. In one example, the SS block number (or called SS block index) identifies a SS block transmitted by the BS in a time instance. In one example, the SS block includes at least one SS (e.g. primary SS or secondary SS) and a physical broadcast channel (PBCH).

In one example, the UE acquires the system time from the BS by receiving the at least one SS from the BS. In one example, the UE acquires the system time by receiving a PBCH. In one example, the UE gets the SFN, the subframe number, the timeslot number, the SS burst set number, the SS burst number or the SS block number from the at least one SS or the PBCH.

In one example, the UE determines the location of the measurement gaps above according to an equation. The equation utilizes at least one of the SFN, the subframe number, the timeslot number, the SS burst set number, the SS burst number, and the SS block number, with arithmetic (e.g., modulo, dividing, multiplying, adding and/or subtracting). For example, the equation maybe the following equation and the first subframe of each gap occurs at an SFN and a subframe meeting the following equation:

$$\text{SFN mod T}=\text{FLOOR}(gapOffset/N);$$

$$\text{subframe}=gapOffset \bmod N;$$

with T=Measurement Gap Repetition Period (MGRP)/N.

The first measurement gap configuration configures a first MGRP and a first gapOffset and the second measurement gap configuration configures a second MGRP and a second gapOffset.

In one example, the carriers described above may belong to the same radio access technology (RAT) (e.g., LTE or NR/5G) or different RATs. The serving cell may be a primary cell (PCell), a secondary cell (SCell) or a primary SCell.

In one example, when the BS releases a carrier or a serving cell for the UE, the BS schedules (or performs) transmissions to other UE(s) on the carrier or the serving cell.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides methods and devices for handling measurement gaps. When a failure occurs, the UE releases the current measurement gap configuration and applies another measurement gap configuration after recovering the failure. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling measurement gaps, comprising:
   a storage device; and
   a processing circuit, coupled to the storage device, wherein the storage device stores, and the processing circuit is configured to execute instructions of:
   receiving a first measurement gap configuration from a base station (BS) on a first carrier, wherein the first measurement gap configuration configures a first plurality of measurement gaps for the communication device;
   determining a first plurality of gap locations of the first plurality of measurement gaps in a timeline according to system time acquired from the BS and the first measurement gap configuration;
   performing at least one first measurement on a second carrier in at least one of the first plurality of measurement gaps according to the first plurality of gap locations;
   detecting a failure; and
   releasing the first measurement gap configuration in response to the failure.

2. The communication device of claim 1, wherein the first measurement gap configuration is a carrier-specific measurement gap configuration.

3. The communication device of claim 1, wherein the instructions further comprise:
   receiving a second measurement gap configuration from the BS, after performing a RRC connection reestablishment procedure successfully, wherein the second measurement gap configuration configures a second plurality of measurement gaps for the communication device;
   determining a second plurality of gap locations of the second plurality of measurement gaps in the timeline according to the system time acquired from the BS and the second measurement gap configuration;
   performing at least one second measurement on the second carrier in at least one of the second plurality of measurement gaps according to the second plurality of gap locations.

4. The communication device of claim 3, wherein the second measurement gap configuration is a user equipment (UE)-specific measurement gap configuration.

5. The communication device of claim 3, wherein the instructions further comprise:

keeping the second measurement gap configuration, if the communication device receives the second measurement gap configuration from the BS before detecting the failure.

6. The communication device of claim 1, wherein the instructions further comprise:
stopping performing the at least one first measurement on the second carrier, when releasing the first measurement gap configuration.

7. The communication device of claim 1, wherein the system time comprises at least one of a system frame number (SFN), a subframe number, a timeslot number and a synchronization signal (SS) block number.

8. A communication device for handling measurement gaps, comprising:
a storage device; and
a processing circuit, coupled to the storage device, wherein the storage device stores, and the processing circuit is configured to execute instructions of:
receiving a first measurement gap configuration from a BS on a first carrier, wherein the first measurement gap configuration configures a first plurality of measurement gaps for the communication device;
determining a first plurality of gap locations of the first plurality of measurement gaps in a timeline according to system time acquired from the BS and the first measurement gap configuration;
performing at least one first measurement on a second carrier in at least one of the first plurality of measurement gaps according to the first plurality of gap locations;
detecting a failure; and
keeping the first measurement gap configuration in response to the failure.

9. The communication device of claim 8, wherein the instructions further comprise:
stopping performing the at least one first measurement on the second carrier, when keeping the first measurement gap configuration.

10. A base station (BS) for handling measurement gaps, comprising:
a storage device; and
a processing circuit, coupled to the storage device, wherein the storage device stores, and the processing circuit is configured to execute instructions of:
transmitting a first measurement gap configuration to a communication device on a radio resource control (RRC) connection, wherein the first measurement gap configuration configures a first plurality of measurement gaps associated to a first serving cell;
determining a first plurality of gap locations of the first plurality of measurement gaps in a timeline according to system time of the BS and the first measurement gap configuration;
releasing the first measurement gap configuration, when releasing the first serving cell;
transmitting a second measurement gap configuration to the communication device on the RRC connection, after releasing the first measurement gap configuration, wherein the second measurement gap configuration configures a second plurality of measurement gaps associated to a second serving cell or not associated to any serving cell;
determining a second plurality of gap locations of the second plurality of measurement gaps in the timeline according to the system time of the BS and the second measurement gap configuration; and
skipping the second plurality of measurement gaps, when scheduling a first plurality of transmissions to the communication device.

11. The BS of claim 10, wherein the instructions further comprise:
skipping the first plurality of measurement gaps, when scheduling a second plurality of transmissions to the communication device.

12. The BS of claim 10, wherein the instructions further comprise:
transmitting a first RRC message to release the first serving cell for the communication device; and
receiving a first RRC response message from the communication device in response to the first RRC message.

13. The BS of claim 12, wherein the instructions further comprise:
transmitting the second measurement gap configuration in the first RRC message or in a second RRC message on the RRC connection, to the communication device; and
receiving a second RRC response message from the communication device in response to the second RRC message.

14. The BS of claim 10, wherein the instructions further comprise:
keeping the second measurement gap configuration, in response to a RRC connection reestablishment procedure with the communication device or when releasing the first measurement gap configuration or the first serving cell, wherein the BS transmits the second measurement gap configuration to the communication device before releasing the first serving cell.

* * * * *